US008321494B2

(12) United States Patent
Ferguson et al.

(10) Patent No.: US 8,321,494 B2
(45) Date of Patent: Nov. 27, 2012

(54) METHOD AND APPARATUS FOR REPORTING AND INVOICING OF DATA DOWNLOADS

(75) Inventors: David Ferguson, Cambridge (GB); Andrew Pearce, Cambridge (GB)

(73) Assignee: Velocix Ltd., Cambridge (GB)

( * ) Notice: Subject to any disclaimer, the term of this patent is extended or adjusted under 35 U.S.C. 154(b) by 246 days.

(21) Appl. No.: 11/949,334

(22) Filed: Dec. 3, 2007

(65) Prior Publication Data
US 2009/0144340 A1 Jun. 4, 2009

(30) Foreign Application Priority Data

Dec. 3, 2007 (GB) .................................. 0723659.9

(51) Int. Cl.
*G06F 15/16* (2006.01)
(52) U.S. Cl. .......................... 709/202; 709/201; 709/203
(58) Field of Classification Search .................. 709/201, 709/202, 203
See application file for complete search history.

(56) References Cited

U.S. PATENT DOCUMENTS

| | | | | |
|---|---|---|---|---|
| 7,236,950 B2* | 6/2007 | Savage et al. | .................... | 705/34 |
| 2002/0042750 A1* | 4/2002 | Morrison | ........................ | 705/26 |
| 2002/0065919 A1* | 5/2002 | Taylor et al. | .................. | 709/226 |
| 2004/0117455 A1* | 6/2004 | Kaminsky et al. | ............ | 709/214 |
| 2004/0148237 A1* | 7/2004 | Bittmann et al. | ............... | 705/35 |
| 2005/0192863 A1* | 9/2005 | Mohan | ............................. | 705/14 |
| 2005/0203851 A1* | 9/2005 | King et al. | ....................... | 705/51 |
| 2006/0041494 A1* | 2/2006 | Tinnirello et al. | .............. | 705/35 |
| 2007/0073624 A1* | 3/2007 | Ishibashi et al. | ................. | 705/53 |
| 2007/0149168 A1* | 6/2007 | Hariki | ............................ | 455/405 |
| 2007/0209005 A1* | 9/2007 | Shaver et al. | ................. | 715/733 |
| 2007/0244983 A1* | 10/2007 | Berger | .......................... | 709/217 |
| 2008/0022012 A1* | 1/2008 | Wang | ............................ | 709/238 |
| 2008/0037438 A1 | 2/2008 | Twiss | | |
| 2008/0037455 A1* | 2/2008 | Kikuchi | ........................ | 370/310 |
| 2008/0040482 A1 | 2/2008 | Twiss | | |

(Continued)

FOREIGN PATENT DOCUMENTS
GB        2440759 A1        2/2008
(Continued)

OTHER PUBLICATIONS

Akamai Media Delivery www.akamai.com/html/solutions/media_delivery.html, Jul. 13, 2007.

*Primary Examiner* — Hieu Hoang
(74) *Attorney, Agent, or Firm* — Ryan, Mason & Lewis, LLP

(57) ABSTRACT

The present invention provides an apparatus for reporting about a download of an item of digital data to an end user from a plurality of logged data sources. The item of digital data is downloadable in one or more sessions but also divisible into portions. The apparatus comprises multiple event logs being associated with the logged data sources of the plurality of logged data sources. The apparatus further comprises a retrieving device for retrieving the multiple event logs from the logged data sources. The apparatus further comprises multiple event logs indicating the portions of the item of digital data downloaded in at least one of the one or more sessions. The apparatus further comprises a reporting device for combining the at least one event log and producing a report of the download of the item of digital data.

20 Claims, 10 Drawing Sheets

U.S. PATENT DOCUMENTS

| | | | |
|---|---|---|---|
| 2008/0091790 A1* | 4/2008 | Beck | 709/217 |
| 2008/0097805 A1* | 4/2008 | Wells | 705/7 |
| 2008/0195546 A1* | 8/2008 | Lilley | 705/59 |
| 2008/0215755 A1* | 9/2008 | Farber et al. | 709/245 |
| 2009/0132310 A1* | 5/2009 | Shear et al. | 705/7 |

FOREIGN PATENT DOCUMENTS

| | | |
|---|---|---|
| GB | 2440774 A1 | 2/2008 |
| WO | 2007/003491 A1 | 1/2007 |

* cited by examiner

METHOD AND APPARATUS FOR REPORTING AND INVOICING OF DATA DOWNLOADS

FIELD OF THE INVENTION

The present invention relates to a method and network for reporting and billing for data downloads of digital data from multiple data sources, in particular in a peer-to-peer network.

BACKGROUND OF THE INVENTION

A content distribution network (CDN) is a system of computers networked together across the Internet that cooperate to deliver digital data in the form of content (such as large media content including videos and audio files) to end users. Examples of such prior art content based CDNs include Sandpiper, Skycache, Digital Island and Akamai.

The number of content servers in prior art CDNs varies and depends on the architecture of the CDN. Some of the CDNs have thousands of nodes with tens of thousands of content servers. When an end a user wishes to download content from the CDN, content requests for an item of digital data are sent to the CDN from the end user. These content requests are directed to the one of the CDN content servers that can provide the best service to the end user.

Content providers use the services of operators of CDNs to distribute their content to the end users. The content is distributed by enabling the end user to download the item of digital data desired from the CDN. Using a reporting and billing system the CDN operator then provides a report to the content owner about the delivery of the item of digital data and bills the content owner on the basis of that report for the use of the service.

Recently a new generation of CDNs has emerged which employ a Peer-to-Peer (P2P) architecture and allow the download of the items of data from "multiple data sources". Operators of CDNs using such P2P architecture are no longer required to maintain large farms of expensive, high performance content servers to distribute the data. Rather a few such content servers in combination with web caches and peers or a combination of these data sources are used to supply the end user with content An example for the CDN is disclosed in the applicant's co-pending patent applications, UK Patent Application No. GB061596.3 (& U.S. patent application Ser. No. 11/598,115) and UK Patent Application No. GB0615962.8 (& U.S. patent application Ser. No. 11/598,114).

An example of a prior art CDN for the distribution of items of digital data is the system run by Akamai Technologies. Details of the prior art CDN are to be found at the following website http://www.akamai.com/html/solutions/media_delivery.html, downloaded on 13 Jul. 2007. Akamai's CDN uses a single content server for the provision of the item of digital data. The Akamai reporting and billing system collects event logs for the download of the item of digital data. The reporting and the billing are simply based on the transmission of the item of digital data to the end user from the single content server in a single session and the bill is issued relating to the use of bandwidth.

In the CDN of the application the download of the item of digital data can be realized by one or more sessions. During different ones of the sessions different portions of the item of digital data are downloaded from different ones of the multiple data sources.

The term "multiple data sources" means in this context data sources on which the portions of the item of digital data are stored. The multiple data sources may be conventional content servers, web caches or peers or a combination of any of these data sources. It is irrelevant how the portions are distributed across the data sources. The download of the item of digital data from the multiple data sources can be affected by selecting in different sessions arbitrary portions from arbitrary ones of the multiple data sources. The download of the item of digital data may contain breaks between different ones of the sessions. For example, the download of the item of digital data to a laptop by the end user may be interrupted when the laptop is turned off or is disconnected from the Internet.

There is a need in the CDNs having multiple data sources to compile and issue correct reports and invoices about the delivery of the item of digital data. More particularly, in the CDN, an operator needs to bill for completion of the download of the item of digital data and to report to the content owners how and whether the download of the item of digital data has been completed and whether any problems during the download of the item of digital data have been encountered. Billing and reporting in the CDN needs to be based on how and whether or not a download has been concluded. Relying on the mere transmission of the item of digital data is not sufficiently accurate. More particularly, the billing and reporting in the CDN needs to be based on how and whether or not the end user has indeed received all the portions of the item of digital data.

One solution might, of course, be to bill on the download of every individual portion of the digital data from a cache or content server. However, the pricing model for the download of the item of digital data may have changed during the download and this could not be reflected in the pricing. Furthermore, it is possible that some of the portions are downloaded twice from different ones of the data sources and should only be invoiced once. It is also possible that much (or even all) of the digital data is downloaded from peers in the P2P network and therefore only a smaller bill would be issued.

There is therefore a further need in CDNs employing multiple data sources to establish which ones of the one or more sessions taken together conclude the complete download of the item of digital data.

It is possible that in the CDN one of the multiple data sources, such as the content server, may not have passed all of the portions of the digital data to the end user. Currently, the content server and any billing and reporting system takes into account messages from the peers informing whether all portions of the digital data have been passed to the end user.

These and other problems of prior art CDNs are addressed by the invention.

SUMMARY OF THE INVENTION

The present invention provides an apparatus for reporting a download of an item of digital data from a plurality of logged data sources to an end user. The item of digital data is downloadable in one or more sessions and also divisible into portions. The apparatus comprises multiple event logs. One of the multiple event logs is associated with one of the plurality of logged data sources. The apparatus further comprises a retrieving device for retrieving the multiple event logs from at least one of the logged data sources. The multiple event logs indicate the portions of the item of digital data downloaded in at least one of the one or more sessions. The apparatus farther comprises a reporting device for combining the at least one of the multiple event logs and producing a report of the download of the item of digital data.

The apparatus is used in one aspect of the invention in a CDN. The plurality of logged data sources are networked in the CDN and operators of the CDN use the apparatus to issue reports to a content provider who uses the CDN for having content distributed to the end user from the logged data sources.

The invention allows for cost-effective as well as efficient and accurate reporting of the downloading of the item of digital data. A report is produced in a quick and cost-effective manner, as the multiple event logs are readily available and contain all of the required information. The apparatus thus uses pre-existing information for producing the report by combining the information about the one or more sessions to determine contiguous events—and determine what was actually received by the end user.

The reporting device is efficient and accurate as by combining the multiple event logs it is made possible to report the download in a single result even though the download of the item of digital data might have occurred during the one or more sessions from different ones of the data sources. The report is based on information relating to the download of the item of digital data from the logged data sources rather than the receipt of the item of digital data by the end user.

One example will serve to illustrate this accuracy. It may happen that the download of the item of digital data by the end user is interrupted a number of times. This could happen if a laptop is turned off or a computer otherwise disconnected from the Internet. Hence the download takes place in one or more sessions. During each one of the sessions only portions of the item of digital data are downloaded, i.e. the complete item of digital data was not downloaded in any single session. The reporting device apparatus reports only the single download, no matter how many one or more sessions it took to obtain all the portions making up the item of digital data to the end user.

The reporting device is reliable as by combining the session information from the multiple event logs it is made difficult for the end user to download the item of digital data without the download being reported. The opportunity for fraud is therefore reduced.

The invention also allows a uniform price model to be applied across the entire download. It is possible, for example, that the pricing model of the item of digital data is amended during the download. The invention allows the information about the pricing model to be initially retained and the download billed at the initially contracted pricing model.

According to one aspect of the invention the multiple event logs comprise multiple log lines. The multiple log lines comprise session information relating to the one or more sessions. For example, the log lines within any one of the multiple event logs are a record whether during at least one the sessions at least portions of the item of digital data were downloaded to the end user. As a simple example, the event information are tabulated strings of ASCII text characters forming the log lines representing, but not limited to, the following information: an identifier of the end user, a name of the item of digital data, an end-time of the at least one of the multiple sessions, a duration of the at least one of the multiple sessions, a number of transmitted bytes of the portions of the item of digital data, a number of received bytes of the portions of item of digital data, a number of portions of the item of the digital data that the end user has at the beginning of the at least one session from one of the plurality of logged data sources and a number of downloaded portions of the item of digital data at the end of one of the sessions.

According to one aspect of the invention a database is provided which comprises association information for associating a name for a content provider with the name of the item of the digital data. It is contemplated that after the reporting device has retrieved at least one of the multiple event logs, the reporting device further looks up in the database the name for the content provider associated with the item of the digital data. The reporting device then produces at least one content provider event log by grouping the plurality of the log lines obtained from the multiple event logs retrieved according to the name for a content provider.

For example, by means of this database look-up the invention may keep track of which portions of the item of digital data from which content provider has been downloaded in the one or more sessions. The database look-up and the grouping of the log lines ensure correct invoicing in case the report is used as the basis for production of an invoice about the download of the item of digital data to the end user.

According to one aspect of the invention the reporting device produces a report of the download of the item of the digital data by merging those log lines from the event logs or the customer event logs that comprise the name of the item of the digital data and the identifier of the end user.

An example of how this merging can be put into practice is by concatenating all of the log lines comprising the identifier of the end user and the name of the item of digital data. Every time the end user downloads in one of the sessions some of the portions of the item of digital data, a specific log line in the event logs is created. This specific log line is a "footprint" representing one of the multiple ones of the sessions. By concatenating all the log lines comprising the identifier of the end user and the name of the item of digital data, a "trail of footprints" is left behind in a cost-effective and efficient manner by the end user while downloading the portions of the item of digital data in the one or more sessions from the plurality of logged data sources.

According to another aspect of the invention, the apparatus further comprises at least one tracker for monitoring the download of the item of digital data. The tracker has a tracker log comprising tracker information relating to the download of the item of digital data from the plurality of data sources to the end user.

The reporting device correlates the event information in the plurality of log lines with the tracker information in the tracker log. This allows the reception of the portions of the item of digital data by the end user to be inferred from the tracker, if the reception of the portions of the item of digital data cannot be obtained from the event logs. The correlation of the event information with the tracker information adds a yet further degree of certainty about reporting and thus billing in that only the complete downloads are reported. For example, a complete download will be reported, even though the end user has not confirmed complete reception of the item of digital data to any one of the multiple logged data sources from which the concluding session took place. The tracker information however can be used to establish the completion of the download. It is immaterial whether this lack of confirmation of complete reception is inadvertent or whether it is a deliberate attempt to defraud the system.

The invention further provides a method for reporting a download of an item of digital data from a plurality of logged data sources to an end user. The item of digital data is downloadable in one or more sessions and divisible into portions. The method comprises retrieving from at least one of the logged data sources at least one of the multiple event logs indicating the portions of the item of digital data downloaded in at least one of the one or more sessions. After the multiple event logs are retrieved, the multiple event logs are combined to produce a report of the download of the item of digital data.

The invention further provides a method for invoicing for a download of an item of digital data from a plurality of logged data sources by an end user. The item of digital data is downloadable in one or more sessions and divisible into portions. The method comprises retrieving from at least one of the logged data sources at least one of the multiple event logs indicating the portions of the item of digital data downloaded in at least one of the one or more sessions, combining the retrieved multiple event logs with pricing parameters to produce an invoice log file and producing a final invoice from the invoice log file.

The invoice can be based on three types of pricing models. In a first model, an invoice is issued for the portions of digital data received by the end user from the logged data sources and/or the other peers in the network. In a second model, the invoice is issued for the portions of the digital data transmitted from the logged data sources to the end user (but not from the peers). In a third model, the invoice is issued for the completion of the download of the item of digital data from either the logged data sources and/or the peers.

DETAILED DESCRIPTION OF THE INVENTION

Figure 1:
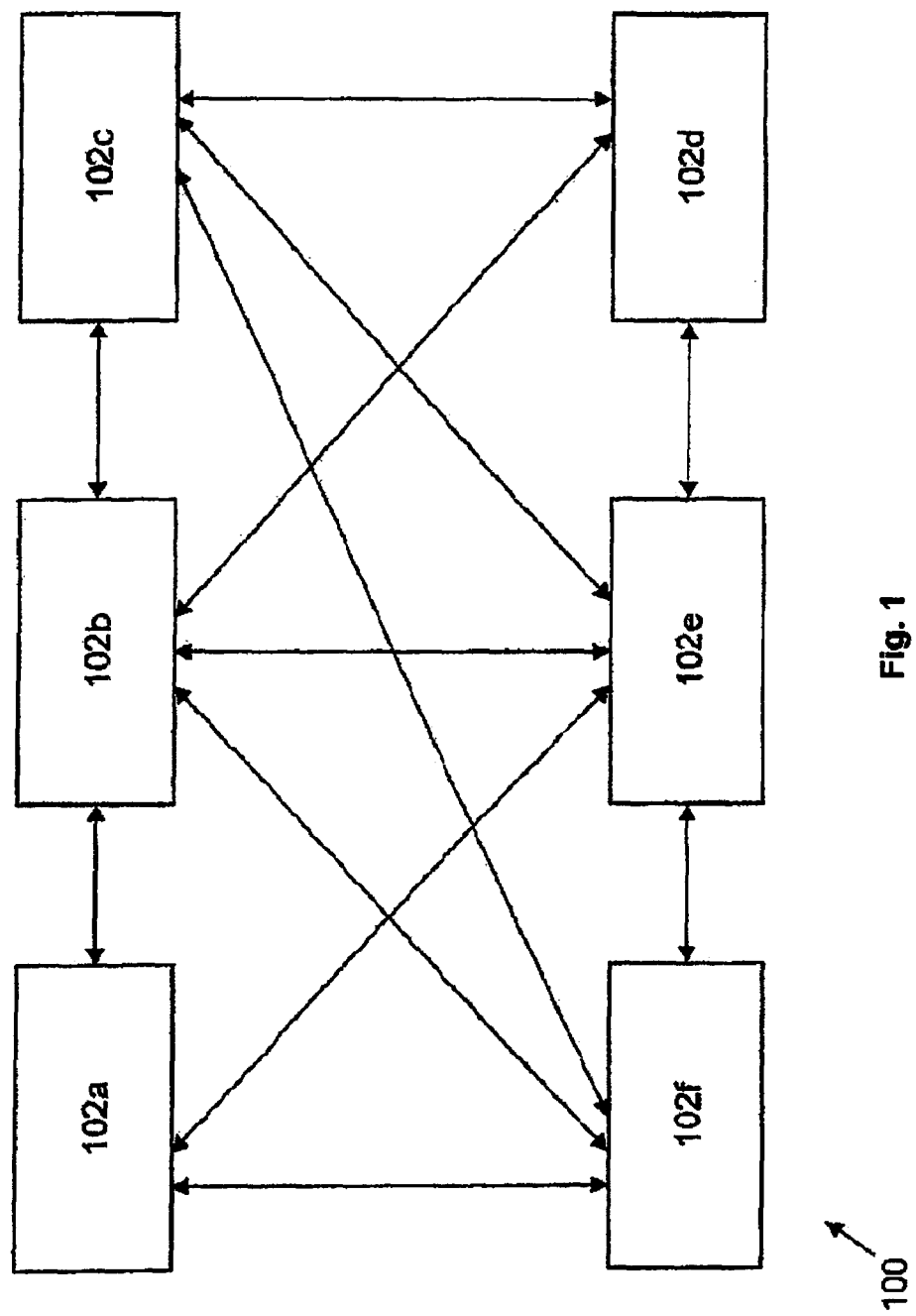
FIG. 1 shows a Peer-to Peer network as known in the art.

A peer-to-peer (also termed P2P) computer network is a network that relies primarily on the computing power and bandwidth of the participants in the computer network rather than concentrating computing power and bandwidth in a relatively low number of data sources such as servers, caches or peers. P2P computer networks are typically used for connecting nodes of the computer network via largely ad hoc connections. The P2P computer network is useful for many purposes. Sharing content files containing, for example, audio, video and data is very common. Real time data, such as telephony traffic, is also passed using the P2P network.

A pure P2P network does not have the notion of clients or servers, but only equal peer nodes that simultaneously function as both "clients" and "servers" to the other nodes on the network. This model of network arrangement differs from the client-server model in which communication is usually to and from a central server. A typical example for a non P2P file transfer is an FTP server where the client and server programs are quite distinct. In the FTP server clients initiate the download/uploads and the servers react to and satisfy these requests from the clients.

Some networks and channels, such as Napster, OpenNAP, or IRC @find, use a client-server structure for some tasks (e.g., searching) and a P2P structure for other tasks. Networks such as Gnutella or Freenet use the P2P structure for all purposes, and are sometimes referred to as true P2P networks, although Gnutella is greatly facilitated by directory servers that inform peers of the network addresses of other peers.

One of the most popular file distribution programmes used in P2P networks is currently BitTorrent which was created by Bram Cohen. BitTorrent is designed to distribute large amounts of data widely without incurring the corresponding consumption in costly server and bandwidth resources. To share a file or group of files through BitTorrent, clients first create a "torrent file". This is a small file which contains meta-information about the files to be shared and about the host computer (the "tracker") that coordinates the file distribution. Torrent files contain an "announce" section, which specifies the URL of a tracker, and an "info" section which contains (suggested) names for the files, their lengths, the piece length used, and a SHA-1 hash code for each piece, which clients use to verify the integrity of the data they receive.

The tracker is a server that keeps track of which seeds (i.e., a node with the complete file or group of files) and peers (i.e., nodes that do not yet have the complete file or group of files) are in a swarm (i.e., the expression for all of the seeds and peers involved in the distribution of a single file or group of files). Nodes report information to the tracker periodically and from time-to-time request and receive information about other nodes to which they can connect. The tracker is not directly involved in the data transfer and is not required to have a copy of the file. Nodes that have finished downloading the file may also choose to act as seeds, i.e. the node provides a complete copy of the file. After the torrent file is created, a link to the torrent file is placed on a website or elsewhere, and it is normally registered with the tracker. BitTorrent trackers maintain lists of the nodes currently participating in each torrent. The computer with the initial copy of the file is referred to as the initial seeder.

Using a web browser, users navigate to a site listing the torrent, download the torrent, and open the torrent in a BitTorrent client stored on their local machines. After opening the torrent, the BitTorrent client connects to the tracker, which provides the BitTorrent client with a list of clients currently downloading the file or files.

Initially, there may be no other peers in the swarm, in which case the client connects directly to the initial seeder and begins to request pieces. The BitTorrent protocol breaks down files into a number of much smaller portions, typically a quarter of a megabyte (256 KB) in size. Larger file sizes typically have larger portions. For example, a 4.37 GB file may have a portions size of 4 MB (4096 KB). The portions are checked as they are received by the BitTorrent client using a hash algorithm to ensure that they are error free.

As further ones of the peers enter the swarm, all of the peers begin sharing the portions with one another, instead of downloading directly from the initial seeder. The clients incorporate mechanisms to optimize their download and upload rates. The peers may download the portions in a random order and may prefer to download the portions that are rarest amongst the peers, to increase the opportunity to exchange the digital data between the peers. Exchange of the digital data is only possible if two of the peers have a different subset of the file. It is known, for example, in the BitTorrent protocol that one of the peers initially joining the swarm will send to the other members of the peers in the swarm a BitField message which indicates an initial set of the portions of the digital data which the peer has available for download by other ones of the peers. On receipt of further ones of the portions, the peer will send a Have message to the other peers to indicate that the further ones of the portions are available for download.

FIG. 1 is a block diagram illustrating an environment in which various embodiments of the invention may be practiced. FIG. 1 includes a Peer-to-Peer (P2P) network 100. The P2P network 100 includes a plurality of peers, such as peer 102a, 102b, 102c, 102d, 102e and 102f, hereinafter referred to as peers 102, connected to each other. The P2P network 100 may be a Local Area Network (LAN), a Wide Area Network (WAN), a Metropolitan Area Network (MAN), a wireless network and the like. The peers 102 present in the P2P network 100 include stored portions of digital data. Various examples of the digital data include, but are not limited to, an application file, a video file, a music file and the like. In the P2P network 100 the digital data is shared among the peers 102. It should be understood that the peers 102 may store multiple copies of the digital data.

Figure 2:
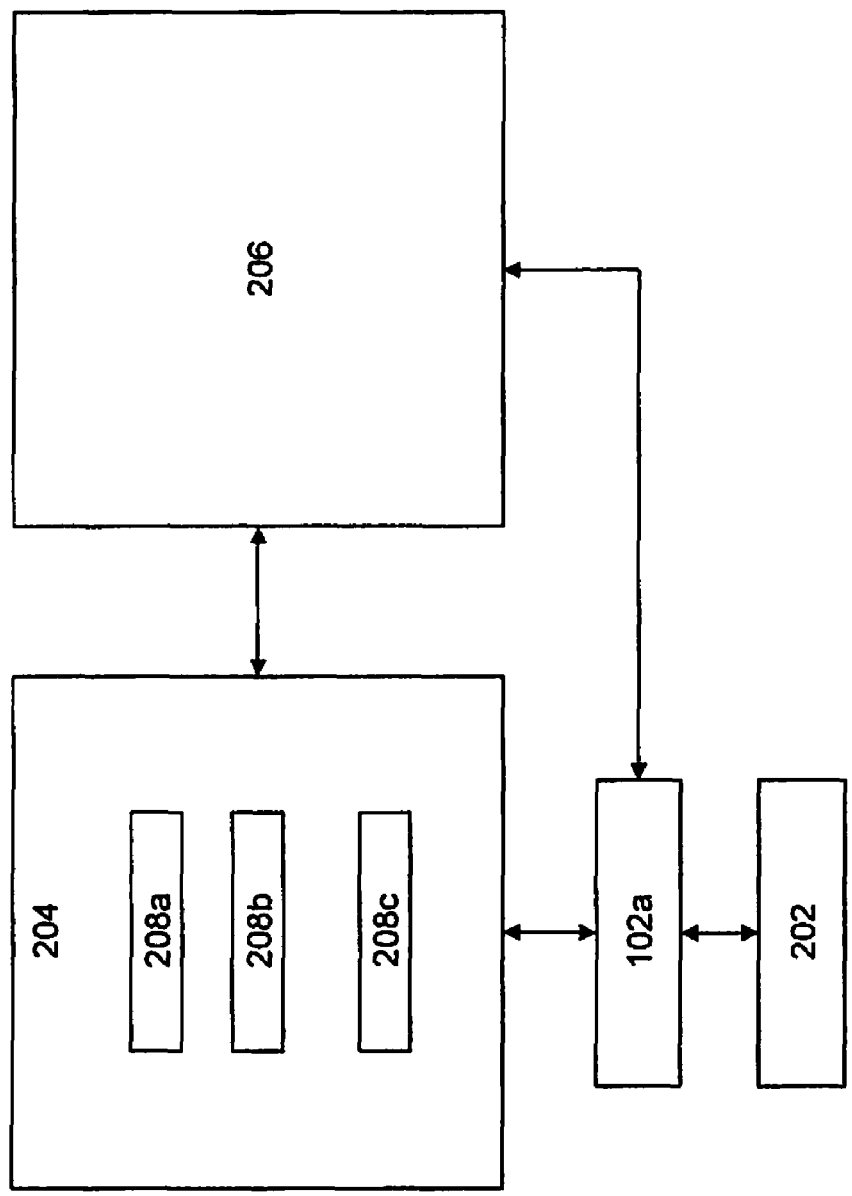
FIG. 2 shows the request for a download of a digital object.

FIG. 2 is a block diagram illustrating a user 202 sending a request for download of a digital object through the peer 102a, in accordance with an embodiment of the invention. FIG. 2 includes the peer 102a, the user 202, a server 204 and a tracker server 206. In an embodiment of the present invention, the server 204 includes one or more torrent files, such as torrent files 208a, 208b and 208c, hereinafter referred to as the torrent files 208. The present invention has been described with respect to BitTorrent protocol as an exemplary embodiment. It should be understood by those skilled in the art that the present invention is applicable to all P2P protocols.

The user 202 makes a request at the peer 102a to download the digital object. The peer 102a communicates with the server 204 and provides information for the digital object to be downloaded to the server 204. Subsequently, the server 204 locates one of the torrent files related to the digital object requested for download by peer 102a, such as, for example, torrent file 208a. In various embodiments of the invention torrent files 208 includes information related to the name, size, number of pieces and check sum error for the digital object to be downloaded by peer 102a.

Subsequently, in various embodiments of the present invention, the tracker server 206 provides a list of peers 102 present in the P2P network 100 with the portions of the digital object to be downloaded. The peer 102a, thereafter, communicates with the available list of peers 102 for downloading the related portions of the digital objects. The peer 102a communicates with peers 102 by sending a bitfield of the portions of the digital object that peer 102a has. After peer 102a receives all the bitfields from peers 102, the peer 102a sends a message to the peers 102 at which the peer 102a finds relevant portions of the digital object and starts downloading the portions of the requested digital object.

Figure 3:
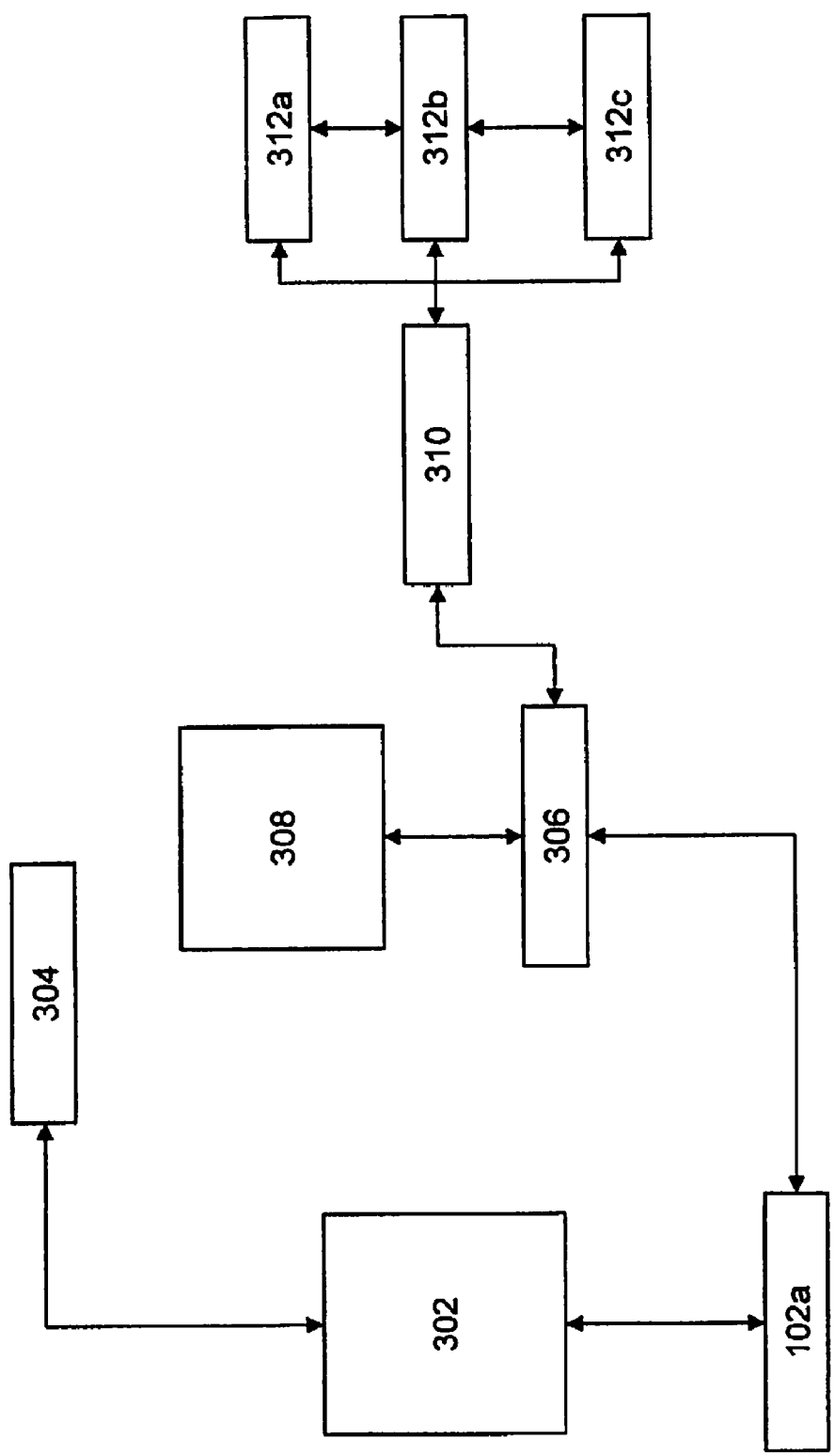
FIG. 3 shows an overview of the network in accordance with the invention.

FIG. 3 is a block diagram illustrating the peer 102a in communication with a Cache Location Server (CLS) 302, in accordance with an embodiment of the present invention. FIG. 3 includes the peer 102a, the CLS 302, a database 304, an Internet Service Provider Domain Name Server (ISP DNS) 306, a central Domain Name Server (central DNS) 308, a cache DNS 310 and one or more caches, such as, cache 312a, 312b and 312c, hereinafter referred to as caches 312.

The peer 102a communicates with the CLS 302. In an aspect of the present invention, the information sent by the peer 102a to the CLS 302 may also contain the IP address of the peer 102a. Based on the received information, the CLS 302 communicates a location string to the peer 102a. In an aspect of the present invention, the CLS 302 may get the location string from the database 304. The database 304 stores information about the IP address ranges of countries, ISPs, regions, towns, etc., for the purpose of generating specific location strings with respect to peers 102.

The peer 102a then, using the location string and information from the torrent file 208, makes communication with the ISP DNS 306.

In various embodiments of the present invention, the information sent by peer 102a to ISP DNS 306 may have the following format:

Protocol-TruncatedHash.Protocol-Publisher-Location-String.Find-Cache.com

An example of the information sent by CLS 302 to peer 102a may be as following:

bt-1234.bt-bigcorp-bigispnyc.find-cache.com where 'bt' represents the BitTorrent protocol used by the peer 102a, '1234' represents a specific hash value associated with the digital object to be downloaded by the peer 102a, 'bigcorp' represents the publisher (a fictional "Big Corporation") of the digital object to be downloaded, and 'bigispnyc' represents the location string for the peer 102a (the New York point of presence for a fictional "Big ISP").

Based on this communication, the ISP DNS 306 redirects the request to the central DNS 308 (which is the name server for the domain contained in the communication). Thereafter, the central DNS 308 provides an address of the cache DNS 310 to the ISP DNS 306. The cache DNS 310, thus, receives a DNS request from the ISP DNS 306 for the digital object to be downloaded. Subsequently, the cache DNS 310 allocates one of the caches 312, such as, for example, cache 312a. In various embodiments of the present invention, the cache DNS 310 may allocate one of the caches 312 based on the load, availability and content on each of them. The cache DNS 310 communicates this information to the ISP DNS 306, which in turn communicates the information to the peer 102a. The peer 102a, thereafter, makes a communication with the cache 312a for downloading the digital object. The communication between the peer 102a and cache 312a is explained in detail in FIG. 4.

Figure 4:
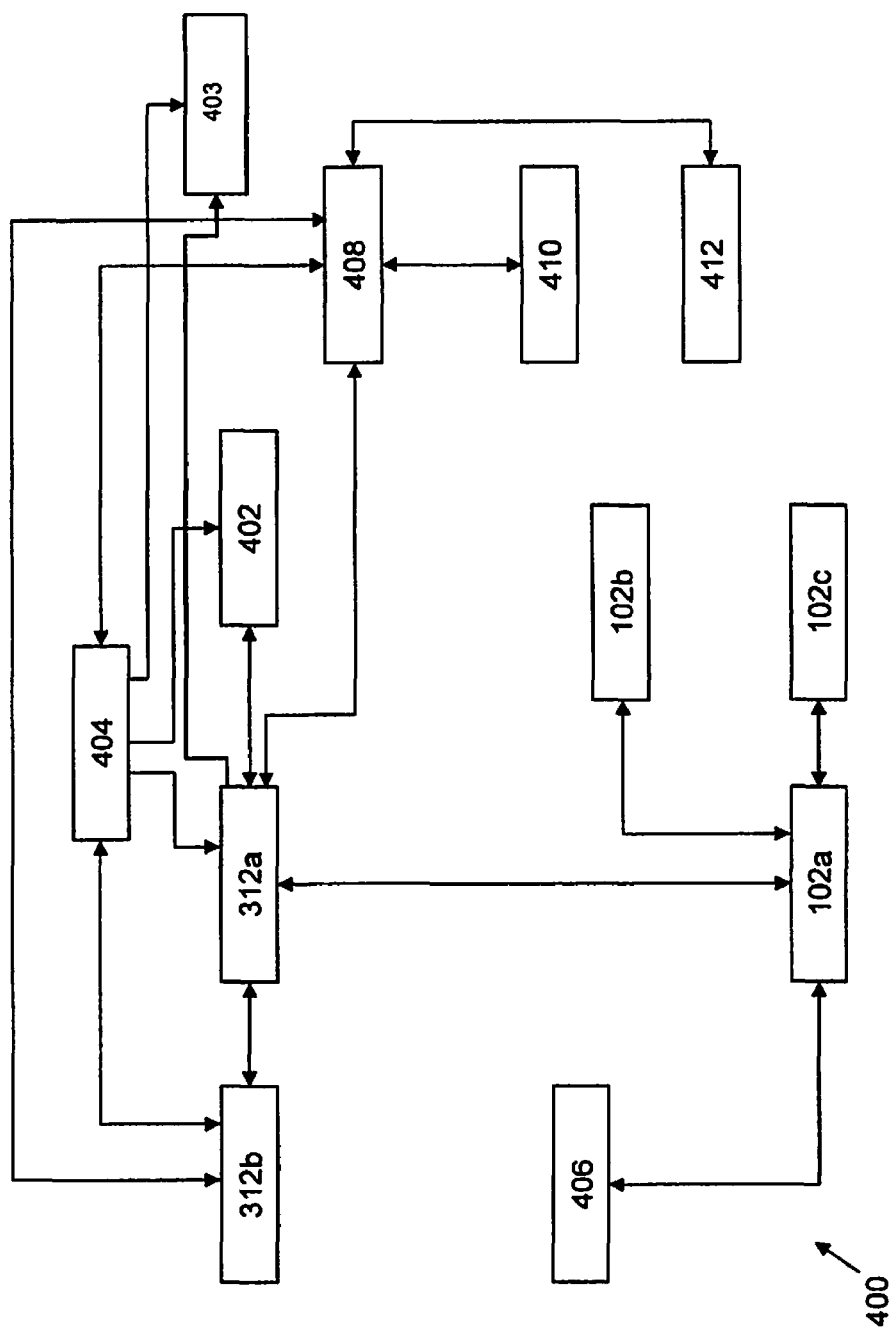
FIG. 4 shows an overview for the distribution of content.

FIG. 4 is a block diagram illustrating a system 400 for content distribution in the P2P network 100. The system 400 includes the peer 102a, 102b and 102c, the cache 312a and 312b, a first content server 402, a second content server 403, a private tracker 404, a public tracker 406, a business logic unit 408, a central database server 410 and a user interface unit 412.

The peer 102a sends a request to the cache 312a for downloading the digital object. The cache 312a is connected to the first content server 402 and/or the second content server 403 and the private tracker 404. In various aspects of the present invention, the first content server 402 and the second content server 403 both include complete copies of a plurality of the stored digital data (i.e., the digital object) in the P2P network 100. According to one aspect of the present invention, the first content server 402 and/or the second content server 403 is/are connected to a publisher's computer network. Both the content server 402 and the second content server 403 receive the digital data to be distributed from the publisher's computer network. For example, the publisher (also called the content provider) wishing to distribute a video file in the P2P network 100 would first upload the video file to the first content server 402 and/or the second content server 403. Thereafter, the video file can be subsequently downloaded by the peers 102 from the first content server 402 or the second content server 403.

According to one aspect of the present invention, as soon as the publisher uploads a portion of the digital data on the first content server 402 or the second content server 403, the digital data becomes available for the peers 102 to be downloaded. Thus, as the publisher progresses with the upload of subsequent pieces of the digital data, the peers 102 are able to download those uploaded portions in parallel. Therefore, the capability of the system 400 to execute parallel uploads and downloads of the digital data from the first content server 402 or the second content server 403 ensures an efficient real time availability of the digital data in the P2P network 100.

The cache 312a downloads the digital data, based on the request from the peer 102a, from the first content server 402 or the second content server 403 or from cache 312b. The private tracker 404 knows which portions of the digital data are available on which ones of the caches 312 and first content server 402 and the second content server 403 and provides this information to the cache 312a. If the digital data requested by the peer 102a is available on the cache 312a, the peer 102a downloads the digital data from the cache 312a. If the digital data is not available on the cache 312a, the cache 312a downloads the requested digital data from the first content server 402 and/or the second content server 403 and/or the cache 312b. Thereafter, the cache 312a makes the digital data available to the peer 102a for downloading. According to one aspect of the present invention, the peer 102a may also download the related digital data from the other peers 102 available in the P2P network 100, such as, for example, peer 102b and peer 102c.

According to another aspect of the present invention, the cache 312a may upload digital data from the peers 102 available in the P2P network 100. In such a case, the cache 312a acts as one of the peers 102.

As discussed above, the private tracker 404 maintains a track of all the data available on the first content server 402 and the second content server 403 and the caches 312. The public tracker 406 is connected to all of the caches 312 and to all of the peers 102 in the P2P network 100. The public tracker 406 maintains a track of all the digital data transferred among the caches 312 and the peers 102. In particular, the public tracker 406 maintains a list of all of the peers 102 and the caches 312 which hold copies of the digital data available in the P2P network 100.

The business logic unit 408 is connected to all the caches 312 and the private tracker 404. The business logic unit 408 authenticates peers 102 before allowing the peers 102 to upload any digital data. Further, the business logic unit 408 is connected to the central database server 410. The business logic unit 408 acts as an interface between the P2P network 100 and the central database server 410. Central database server 410 acquires log reports from the private tracker 404 and caches 312, through the business logic unit 408, for all the data transferred to and from the caches 312 and the first content server 402 and the second content server 403. Using the information from the central database server 410 obtained via the business logic unit 408, such as the log reports, the user interface unit 412 provides the required information for billing purposes and for report generation.

In an embodiment of the present invention, the central database server 410 may be connected to the public tracker 406. In another embodiment of the present invention, the public tracker 406 may be connected to the private tracker 404.

Figure 5:
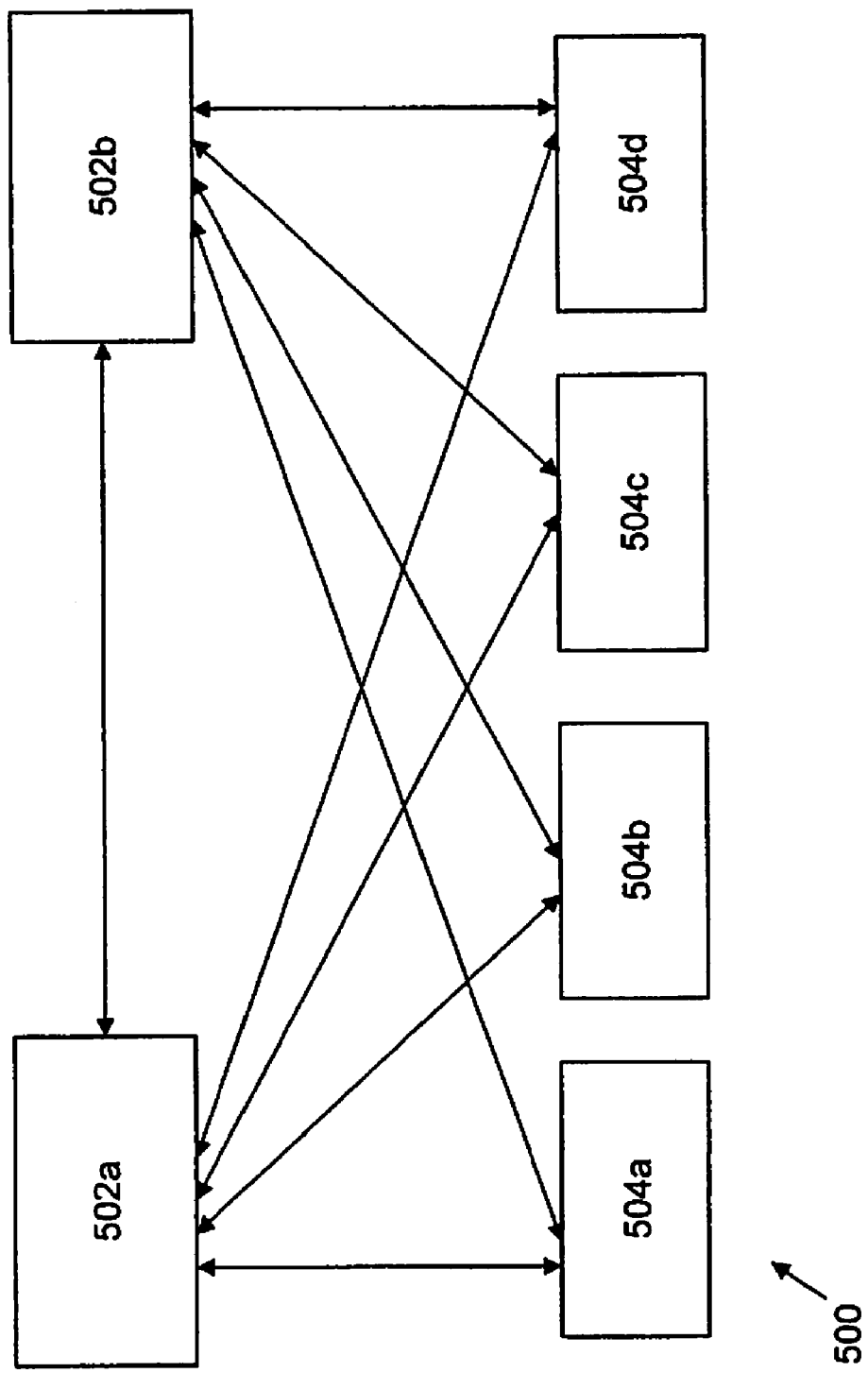
FIG. 5 shows a geographical implementation of a content distribution network

FIG. 5 is a block diagram illustrating an exemplary geographical implementation of a cache distribution network 500, in accordance with various aspects of the present invention. The cache distribution network 500 includes one or more service points of presence, such as a service point of presence 502a and 502b, hereinafter referred to as the service points of presence (POPs) 502. The cache distribution network 500 further includes one or more data points of presence, such as data point of presence 504a, 504b, 504c and 504d, hereinafter referred to as data points of presence (POPs) 504. The service POPs 502 are located at remote geographical locations, such as, for example, London, San Jose and so forth. It should be understood by those skilled in art that the number of the service POPs 502 locations are scalable and may be increased with the increase in network traffic. The service POPs 502, such as the service POP 502a and 502b, are connected to each other. The connection between the service POPs 502 enables a real time data and information transfer between all of the service POPs 502.

Furthermore, the data POPs 504 are also located in remote geographical locations across the globe, such as, for example, New York, Frankfurt, Bangkok, Singapore and so forth. It should be understood by those skilled in the art that the number of the data POPs 504 locations are scalable and may be increased with the increase in network traffic and digital data available in the P2P network 100. The data POPs 504, such as the data POP 504a and 504b, are connected with all the available service POPs 502 in the P2P network 100. The connection between the digital data POPs 504 and service POPs 502 enables a real time data update and information transfer between the data POPs 504 from the service POPs 502.

In an embodiment of the present invention, a geographical location may include both the service POP 502a and the data POP 504a.

Figure 6:
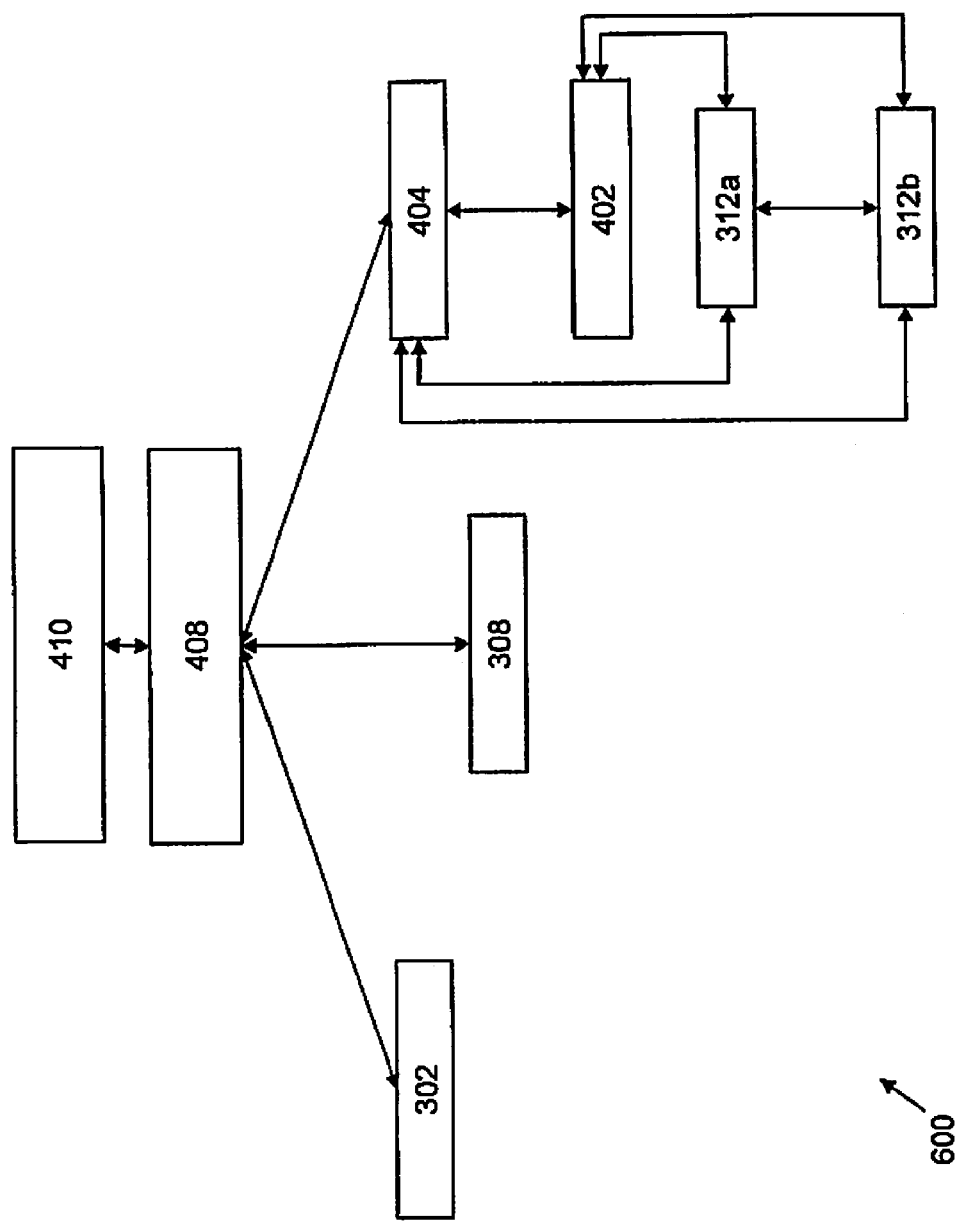
FIG. 6 shows an overview of a service point of presence.

FIG. 6 is a block diagram illustrating an arrangement 600 of the components of the service POP 502a, in accordance with an embodiment of the present invention. The arrangement 600 for the service POP 502a includes the cache location server 302, the central domain name server 308, the content or the content server 403, the private tracker 404 and the central database server 410. Further, in an embodiment of the present invention, the arrangement 600 for the service POP 502a may include the caches 312, such as the cache 312a and 312b. Furthermore, in an embodiment of the present invention, the arrangement 600 for the service POP 502a includes the public tracker 406, the business logic unit 408 and the user interface unit 412.

In various embodiments of the invention, a central database server 410 is located in each of the service POPs 502. The central database servers 410 of each of the service POPs 502 are connected to each other and act as a central database unit.

It should be understood by those skilled in the art that the components illustrated in the arrangement 600 for the service POP 502a are scalable and may be increased based on the network traffic and the digital data available in the P2P network 100.

Figure 7:
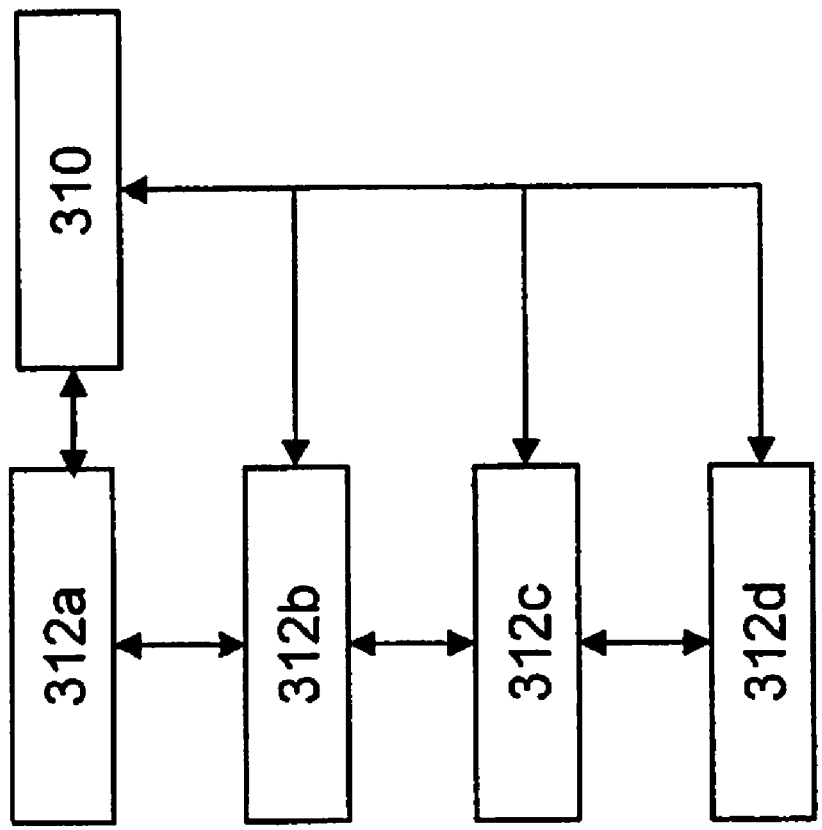
FIG. 7 shows an overview of a data point of presence.

FIG. 7 is a block diagram illustrating an arrangement 700 of the components of the data POP 504a, in accordance with an aspect of the present invention. The arrangement 700 for the data POP 504a includes the caches 312, such as the cache 312a, 312b, 312c and 312d and the cache DNS 310. Only a single cache DNS 310 is shown in FIG. 7 for simplicity. The data POP 504a provides the digital data for the peers 102 in the P2P network 100. The data POPs 504 download data from the service POPs 502.

It should be understood by those skilled in the art that the components illustrated in the arrangement 700 for the data POP 504a are scalable and may be increased based on the network traffic and the digital data available in the P2P network 100.

As discussed above in connection with FIG. 4, the peer 102a downloads from the cache 312a and from the other peers 102 available in the P2P network 100. The rates of delivery of the digital data representing the portions of the digital data vary from the multiple sources, as does the quality and the cost in providing the digital data. For example, the digital data from the peers 312 is not necessarily of high quality and the rate of delivery of the digital data can be, but is not necessarily, slow. On the other hand, the rates of delivery of the digital data from caches 312 can be fairly high, particularly if the connection from the caches 312 to the peer 102a has a high bandwidth. The quality of the digital data is also high if, for example the digital data does not contain many errors. However, the cost of delivering the digital data from the caches 312 is higher than the cost of delivering the digital data from the peers 102.

There is a further issue with the caches 312. The cost of the connection from the peer 102a to the caches 312 is normally related to the maximum throughput provided by the caches 312. As a result, for example, during the day the caches 312 may be extremely busy but at night the caches 312 may not be so busy. The caches 312 (and the connection from the peer 102a to the caches 312) will have capacity available to the caches 312 during the night which has been paid for. The incremental cost in delivering the digital data from the caches 312 during the night is accordingly much smaller than the incremental cost in delivering the digital data from the server 312 during the day.

The rate of delivery of the digital data to the peer 102a is therefore a combination of the rates of delivery of the digital data from the other peers 102 and the caches 312. The cost for the delivery of the digital data varies according to which ones of the multiple sources (i.e., peers 102 and/or caches 312) supplies the digital data. If the digital data is supplied principally from the other peers 102 to which the peer 102a is connected, the cost of the digital data will be small. In particular, if the other peers 102 are served by the same ISP, the cost will be very small. However, the quality of service may not be acceptable.

An unacceptable quality of service is when the peer 102a does not receive the digital data at sufficient speed or the received digital data contains too many errors. One example of an unacceptable quality of service may occur when a user 202 at the peer 102a wishes to watch a video in real time. The video is stored as the digital data in the form of video data. A certain amount of the digital data has to reach the peer 102 within a fixed period of time in order for the peer 102a to watch the video. If the digital data representing the portions of the digital data is not received at the peer 102a, then the user 202 will experience an interruption in the transmission of the video.

The portions of the digital data may be downloaded from the caches 312. However, the downloading of the digital data from the caches 312 is more costly as the bandwidth is wider, the digital data may have to pass over leased lines and the rate of the delivery of the digital data is much higher. The peer 102a can get more than enough digital data from the caches 312 to enable the user 202 to view the video and the quality of data will be much higher.

In essence, a combination of the delivery of the digital data from the other peers 102 and from the caches 312, or even straight from the first content server 402 or the second content server 403 if the delivery of the digital data comes at a cheap cost, offers the best option.

Figure 8:
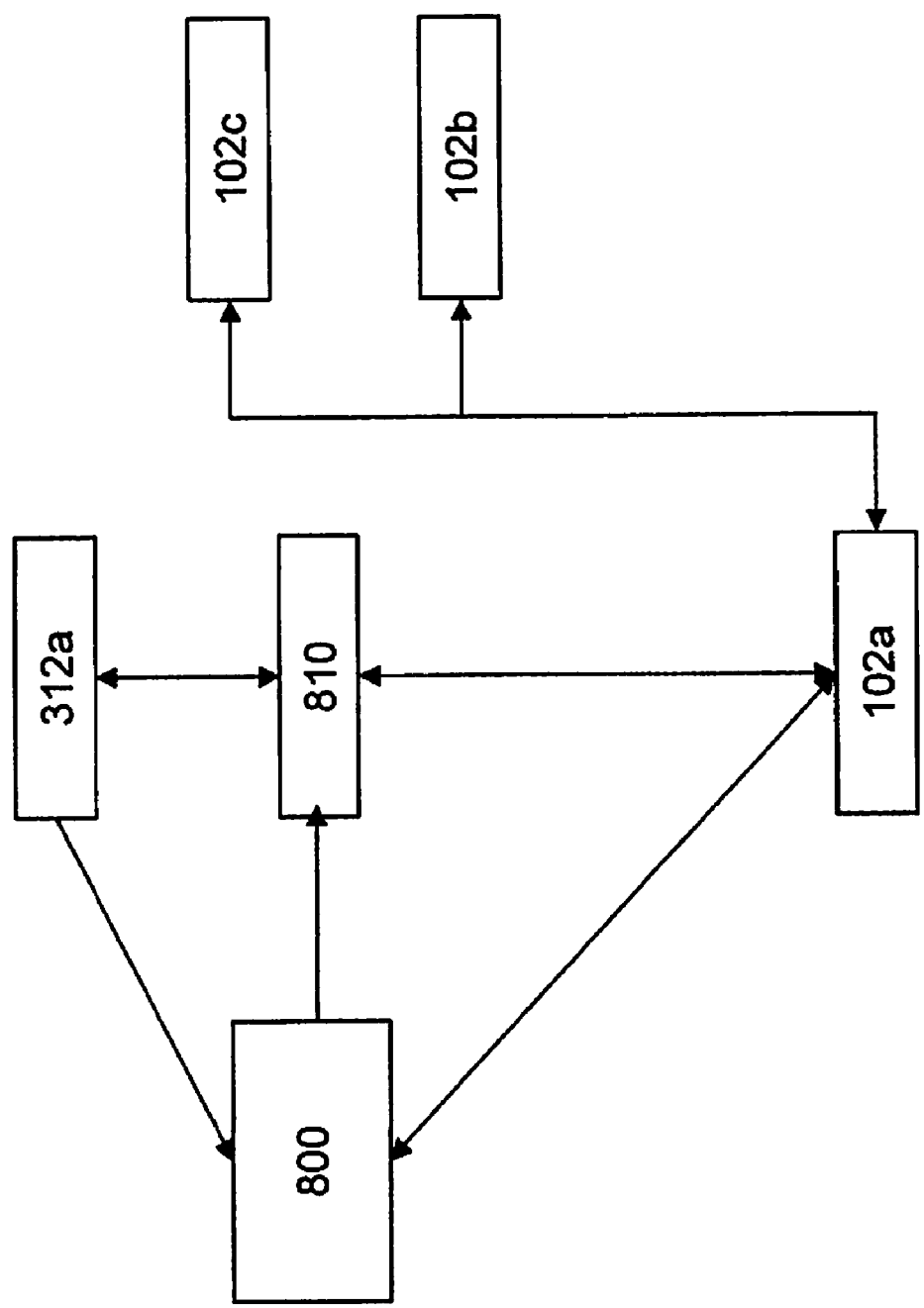
FIG. 8 shows an overview of a data delivery controller and monitor.

In order to perform this combination of the delivery of data, the peer 102a is provided with a data delivery monitor 800 as shown in FIG. 8. FIG. 8 illustrates not only the data delivery monitor 800 but also two of the other peers 102b and 102c supplying the peer 102a with digital data and the caches 312 supplying the peer 102a with digital data. It will be understood that in practice the peer 102a will be connected to multiple other peers 102 and possibly to more than one of the caches 312. A data delivery controller 810 is also illustrated connected in this aspect of the invention to the caches 312.

The data delivery monitor 800 is provided with predetermined quality of service (QoS) parameters. Different ones of the digital data will have different predetermined quality of service parameters. The data delivery monitor 800 monitors the rate of receipt of the digital data at the peer 102a and may monitor the rate of receipt of the digital data from the other peers 102b and 102c as well as from the caches 312, such as cache 312a. The monitored real-time quality of service parameters are compared with predetermined quality of service parameters. The predetermined quality of service parameters can be pre-programmed into the data delivery monitor 800 and/or may be dynamically adjusted. The rate of delivery of the digital data to the peer 102a may be adjusted on the basis of the comparison, as will be discussed below. The data delivery monitor 800 sends QoS information to a data delivery controller 810.

The quality of service parameters include, but are not limited to, the rate of receipt of the delivery of the digital data to the peer 102a, the cost of the delivery of the digital data and the error rate of the received digital data. For example, the pre-determined quality of service parameters could include the requirement that the digital data is received at a rate between 1 Mb and 1.2 Mb per second to allow the viewing of the video by the user 202 at the peer 102a. The pre-determined quality of service parameters might also require that the total cost for the delivery of the digital data not exceed, for example, 30c.

The data delivery monitor 800 and the data delivery controller 810 may be positioned in an appropriate place within the P2P network 100. In the embodiment shown in FIG. 8, the data delivery monitor 800 and the data delivery controller 810 are positioned at the cache 312a. In another embodiment of the invention, the data delivery monitor 800 may be positioned at the public tracker 406 but the data delivery controller 8.10 will be positioned at some or all of the caches 312 and some or all of the peers 102. In still another embodiment of the invention, the data delivery monitor 800 and the data delivery controller 810 may also be positioned at the peers 102 or elsewhere in the P2P network 100. In an aspect of the invention, more than one data delivery monitor 800 and more than one data delivery controller 810 may be employed in the P2P network 100.

The function of the data delivery controller 810 is to receive the QoS information from the data delivery monitor 800 and to adjust the rate of delivery of the digital data from the other peers 102 and the caches 312. The adjustment may be done, for example, by turning off or on some of the connection through which the digital data is delivered to the peer 102a. The peer 102a will therefore receive less data. The adjustment may also be done by changing the bandwidth of the connection between the peer 102a and the other peers 102 or, more commonly, the caches 312. Changing the bandwidth is, for example, particularly appropriate when the source of the digital data is the caches 312 and turning on or off the channel is particularly appropriate when the source of the digital data is one of the other peers 102.

In various aspects of the invention, the data delivery controller 810 may make further decisions. It may choose, for example, to throttle the rate of delivery of the digital data from other peers 102 or from other ones of the caches 312 situated outside of the internet service provider (ISP) at which the peer 102a is situated. The ISP may wish to preferentially use the other peers 102 and any caches 312 within its domain and thus restrict traffic to any ones of the other peers 102 or any caches 312 outside of its domain.

The data delivery monitor 800 in one embodiment of the invention monitors the receipt of the digital data by monitoring content availability messages, such as BitField and Have messages in the BitTorrent protocol. Equivalent techniques and messages exist in other P2P protocols.

In an aspect of the invention, the data delivery controller 810 may also select to preferentially source the digital data from underused caches 312 as discussed above. To take an example using FIG. 5, the nearest caches 312 of the digital data for the peer 102a in Germany is, for example, located in Frankfurt. It would be from a location viewpoint optimal to use the caches 312 in Frankfurt for the delivery of the digital data. On the other hand, if the peer 102a is accessing the digital data in the morning, it is probable that the caches 312 in San Jose are underutilised because of the different time zones whilst the caches 312 in Frankfurt is are operating at or close to their maximum throughput. There may be bandwidth available from the San Jose caches 312 available at minimal incremental cost. As a result, the data delivery controller 810 will attempt to deliver the digital data preferentially from the San Jose caches 312 in order to minimise costs. Alternatively, it is possible that content servers 402, 403 are present in locations which have lower costs.

Figure 9:
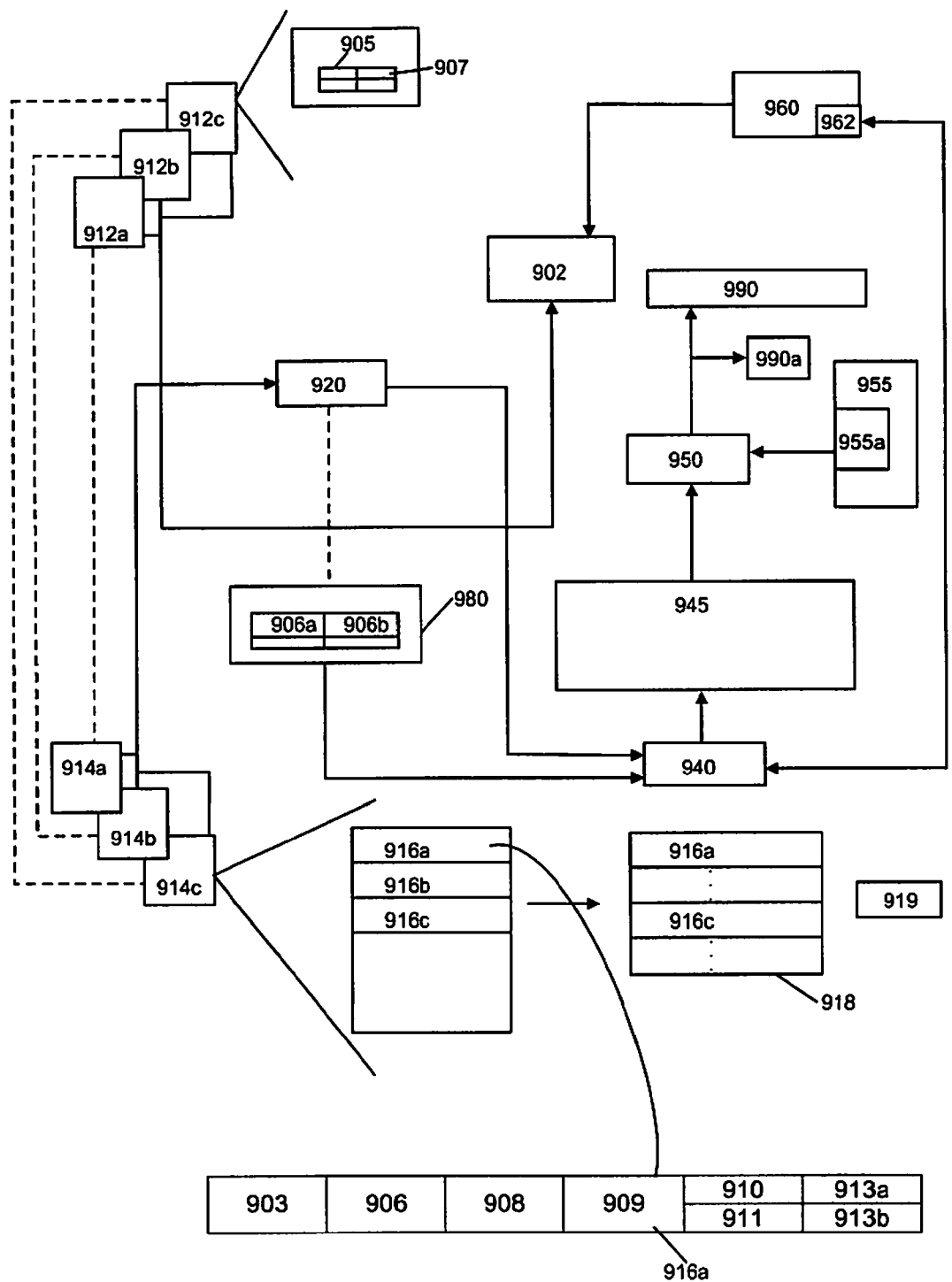
FIG. 9 shows a network for producing a report and an invoice about a download of an item of digital data to an end user
Figure 10:
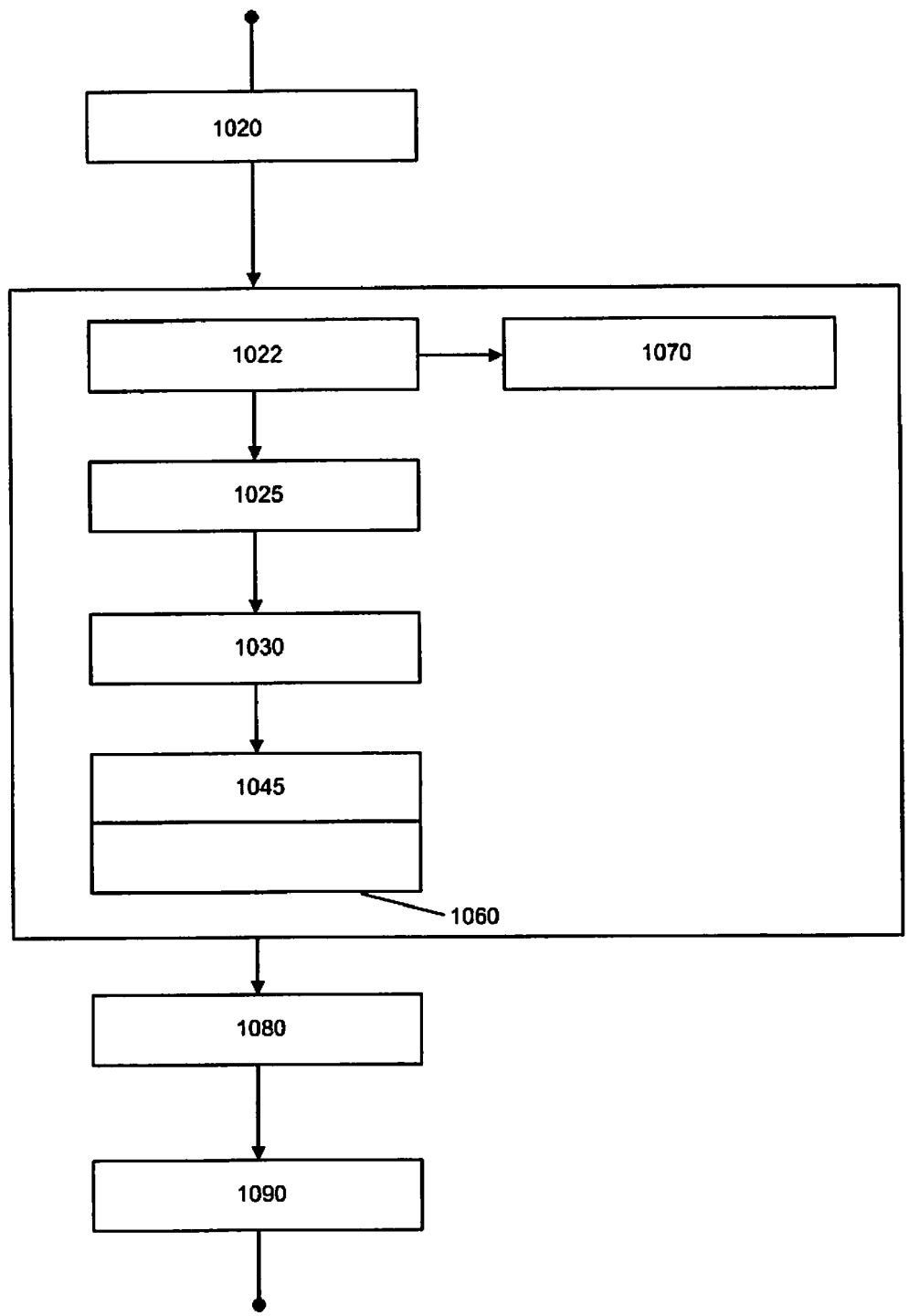
FIG. 10 shows a flow chart for producing a report and an invoice about a download of an item of digital data to an end user

FIG. 9 shows a network 900 which is part of the CDN for the generation of a report 945 about the download to an end user 902 of an item of digital data 905. The network 900 depicted can be thought of as an extension of the network of FIG. 4, the caches 912a-912c and end user 902 of FIG. 9 being equivalent to the caches 312 and the end user 102 of FIG. 4, respectively. FIG. 10 shows a method for the generation of the report 945.

Within the network 900 of FIG. 9 the downloading of the digital data 902 takes place from multiple ones of the caches 912a-912c. Every one of the caches 912 has an event log 914a-914c associated with them. The event log is typically rotated every hour. The event log 914 has a number of log lines 916a-916c. Each one of the log lines 916a-196c in the event log 914a-912c records information about the download of portions of the item of digital data 905. For example, the log lines 916a-916c can record 100 MB of data downloaded per session of the item of digital data 905, one hour of download of the item of digital data 905 or completion of the download of all of the portions 907 of the item of digital data 905. Other information could be stored in the event log 914. If an end user 902 downloads 500 MB of portions 907 of the item of digital data 907 there will be five log lines 916 recorded in the event log 914. Each one of the log lines 916a-916c records, for example, an address of the end user 903 (for example, an IP address), an item name 906 of the item of digital data 905 being downloaded, an end-time 908 of the download, a duration 909 of the download, bytes transmitted 910, bytes received 911, a number of portions 913a of the item of digital data 905 the end user 902 has at the beginning of the download from the cache 912 and the number 913b of downloaded portions 907 of the digital data at the end of the session. Each one of the log lines 916a-916c refers to a single session and provides corresponding event information. If there are one or more sessions, then multiple log lines 916a-916c will be created.

FIG. 9 also shows a retrieving device 920 and a reporting device 940. The retrieving device 920 and the reporting device 940 can be implemented either as separate entities or as modules within a software program.

The retrieving device 920 and the reporting device 940 implement in cooperation a number of routines for retrieving the event information and for processing the event information. The exact distribution of workload in implementing the routines is immaterial and the explanations given below should be construed as non-limiting examples of implementations of those routines. The retrieving device 920 implements a routine EVENT_PROC. The routine EVENT_PROC retrieves at specified times, (for example, 15 minutes past every hour) the event logs 914 from all of the caches 912 in the CDN 900 (step 1020). The routine EVENT_PROC 940 looks up the item name 906 of the item of the digital object 905 in a database 980 and gets a provider name 906a for the name of the content provider of the item of digital data 905 (step 1025). The item name 906b is obtained from the log line 906 in the event log 914 as explained above. The routine EVENT_PROC splits and groups the event logs 914 into a plurality of content provider event logs 918a-918b. This splitting and grouping is based on the provider name 906a of the content provider. Each one of the content provider event logs 918a-918b includes, but is not limited to, the provider name 906a of the provider of the item digital data and the corresponding log lines 916 for the item of the digital data 905.

The reporting device 940 implements a routine SESSION_PROC. The routine SESSION_PROC takes all of the event logs 918 and adds the event logs 918 together (step 1030). The operation of the routine SESSION_PROC is staggered by a specified time frame with respect to the routine EVENT_PROC. At some stage, the routine SESSION_PROC will, after examining the event information in the log lines 918, assign a "session close" tag and create a session log line 919. The "session close" tag means that all of the downloading of an item of the digital data 907 (e.g., one film) is completed. This download may have occurred in one or more sessions as a mentioned above. After a specified time frame, say 20 hours, the session is deemed finalised. This needs to be done because it is possible that one of the caches 912 may be off-line and some of the event logs 914 concerning the downloading of the item of digital data 905 or portions 907 thereof have not been received from the cache. For example, information that the download of the item of digital data has been completed may not have been received.

The retrieving device 920 or the reporting device 940 implements a further routine DOWNLOAD_PROC which merges all of the log lines 919. The DOWNLOAD_PROC routine produces (step 1060) a single line report 945 about the complete download of an item of digital data 905 to an end user 902 having the address 903.

An invoicing device 950 implements a routine INVOICE_PROC. The routine INVOICE_PROC accesses in step 1080 a pricing database 955 in order to obtain pricing parameters 955a and writes back into database 955 additional costs. On the basis of the report 945 the invoicing device 950 produces invoice log files 990a. It is possible to produce three types of report. A first type of report details the portions of the digital item received by the end user and is invoiced on this basis. From the loglines 916 it is possible to deduce which portions of the data have been received either from peers or from one or more of the caches 912 and the invoice is generated on this basis. Similarly, a second type of report will detail the portions of the item of digital data transmitted to the end user from one or more of the caches 912. Finally, a third type of report details the completion of the download of the item of digital data to the end user.

Finally, a routine FINAL_STAGE, preferably implemented by the invoicing device 950, uses the invoice log files 990a to produce in step 1090 a final bill 990 for a specified period. Three types of bill can be produced which correspond to the three types of reports that can be produced.

The invention can also include a checking mechanism (step 1070) to account for certain end users 902 lying to the reporting routines and, consequently, to the INVOICE_PROC routine.

Furthermore, there may be fraudulent behaviour in that the end user 902 may attempt to defraud the caches 912 in order to avoid payment for the item of digital data 905 which has been downloaded.

The checking mechanism in step 1070 obtains tracker information and uses a tracker 960 with a tracker log 962. As has been described earlier, the tracker 960 monitors at various different points the download of the item of digital data 905. Most of the end users 902 will tell the tracker 960 about the download by sending protocol messages as explained above in connection with the BitTorrent protocol as an illustrative example. The tracker information in the tracker logs 962 allows the correlation of the session information gathered from the event logs 914. The end user 902 sends out the information (for example, "have message" in case the BitTorrent protocol is used) that the end user 902 has in fact received a last portion from the portions 905 making up the item of digital data 907. Sometimes, the end user 902 does not send out this information. Rather the end user 902 will tell the other peers 102 and/or the tracker 960 that the end user 902 did receive that last portion of the digital data 905. This exchange of protocol information needs to be correlated with the session information. The checking mechanism can also be used to check that reported file completion rates are consistent with data transmission volumes and flag suspicious download behaviour accordingly.

A set of heuristic algorithms which work out whether this is a merely a session or whether a this download session is the concluding one.

The invention has been described in terms of an illustrative example. The person skilled in the art will recognize that the invention can be practiced with modification within the spirit and scope of the attached claims. At least, it should be noted that the invention is not limited to the detailed description of the invention and/or of the examples of the invention. It is clear for the person skilled in the art that the invention can be realized at least partially in hardware and/or software and can be transferred to several physical devices or products. The invention can be transferred to at least one computer program product. Further, the invention may be realized with several devices.

The invention claimed is:

1. An apparatus for reporting a download of an item of digital data from a plurality of logged data sources in a content distribution network, wherein the item of digital data is downloadable in one or more sessions and divisible into portions, the apparatus comprising:
    multiple event logs, wherein at least one of the multiple event logs is associated with one of the plurality of logged data sources;
    a retrieving device for retrieving from at least one of the logged data sources at least one of the multiple event logs indicating the portions of the item of digital data downloaded in at least one of the one or more sessions to one or more computers of one or more end users distinct from an operator of the content distribution network; and
    a reporting device for combining the retrieved multiple event logs and producing a report of the download of the item of digital data without relying on the one or more computers of the one or more end users, wherein the report of the download of the item of digital data is sent from the operator of the content distribution network to a content provider that provided the item of digital data,
    wherein the reporting device further looks up in a database a name for the content provider associated with the item of digital data and produces the report of the download of the item of digital data by grouping log lines obtained from the at least one of the multiple event logs retrieved according to the name for the content provider.

2. The apparatus as claimed in claim 1, wherein at least one of the log lines comprises event information relating to the at least one of the one or more sessions of the download.

3. The apparatus as claimed in claim 2, wherein the event information is selected by the reporting device from a group consisting of an identifier of the end user, a name of the item of digital data, an end-time of the at least one of the multiple sessions, a duration of the at least one of the sessions, a number of transmitted bytes of the portions of the item of digital data, a number of received bytes of the portions of item of digital data, a number of portions of the item of the digital data that the end user has at the beginning of the at least one session from one of the plurality of logged data sources and a number of downloaded portions of the item of digital data at the end of one of the sessions.

4. The apparatus as claimed in claim 3, wherein the reporting device produces a report of the download of the item of digital data by merging the log lines comprising the name of the item of digital data and the identifier of the end user.

5. The apparatus as claimed in claim 1, wherein the database comprises information associating the name for the content provider with the name of the item of digital data.

6. The apparatus as claimed in claim 1, further comprising at least one tracker for monitoring the download of the item of digital data and having a tracker log comprising tracker information relating to the download of the item of digital data from the plurality of data sources to the end user.

7. The apparatus as claimed in claim 6, wherein the reporting device correlates the retrieved multiple event logs with the tracker information in the tracker log.

8. A method for reporting a download of an item of digital data from a plurality of logged data sources in a content distribution network, wherein the item of digital data is downloadable in one or more sessions and divisible into portions, the method comprising:
    retrieving from at least one of the logged data sources at least one of the multiple event logs indicating the portions of the item of digital data downloaded in at least one of the one or more sessions to one or more computers of one or more end users distinct from an operator of the content distribution network; and
    combining the retrieved multiple event logs to produce a report of the download of the item of digital data without relying on the one or more computers of the one or more end users, wherein the report of the download of the item of digital data is sent from the operator of the content distribution network to a content provider that provided the item of digital data,
    wherein the combining step further comprises looking up in a database a name for the content provider associated with the item of digital data and producing the report of the download of the item of digital data by grouping log lines obtained from the at least one of the multiple event logs retrieved according to the name for the content provider.

9. The method as claimed in claim 8, wherein the log lines comprise event information relating to the at least one of the one or more sessions.

10. The method as claimed in claim 9, wherein combining the multiple event logs further comprises selecting at least one item of download session information selected from a group consisting of an identifier of the end user, a name of the item of digital data, an end-time of the at least one of the one or more sessions, a duration of the at least one of the one or more sessions, a number of transmitted bytes of the portions of the item of digital data, a number of received bytes of the portions of item of digital data, a number of portions of the item of digital data that the end user has at the beginning of the at least one session from one of the plurality of logged data sources and a number of downloaded portions of the item of digital data at the end of one of the sessions.

11. The method as claimed in claim 10, wherein the producing of the report comprises merging the log lines comprising the name of the item of digital data and the identifier of the end user.

12. The method as claimed in claim 8, further comprising correlating the retrieved multiple event logs with tracker information.

13. A method for invoicing for a download of an item of digital data from a plurality of logged data sources in a content distribution network, wherein the item of digital data is downloadable in one or more sessions and divisible into portions, the method comprising:
retrieving from at least one of the logged data sources at least one of the multiple event logs indicating the portions of the item of digital data downloaded in at least one of the one or more sessions to one or more computers of one or more end users distinct from an operator of the content distribution network;
combining the retrieved multiple event logs with pricing parameters to produce an invoice log file of the download of the item of digital data without relying on the one or more computers of the one or more users; and
producing a final invoice from the invoice log file, wherein the final invoice is sent from the operator of the content distribution network to a content provider that provided the item of digital data,
wherein combining further comprises looking up in a database a name for the content provider associated with the item of digital data and producing the invoice log file by grouping log lines obtained from the at least one of the multiple event logs retrieved according to the name for the content provider.

14. The method as claimed in claim 13, further comprises fetching the pricing parameters from a pricing database.

15. The method as claimed in claim 13, wherein at least one of the log lines comprises event information relating to the at least one of the one or more sessions.

16. The method as claimed in claim 13, wherein combining the multiple event logs further comprises selecting the event information from a group consisting of an identifier of the end user, a name of the item of digital data, an end-time of the at least one of the multiple sessions, a duration of the at least one of the multiple sessions, a number of transmitted bytes of the portions of the item of digital data, a number of received bytes of the portions of item of digital data, a number of portions of the item of digital data that the end user has at the beginning of the at least one session from one of the plurality of logged data sources and a number of downloaded portions of the item of digital data at the end of one of the sessions.

17. The method as claimed in claim 13, further comprising correlating the retrieved multiple event logs with tracker information.

18. The method as claimed in claim 13, wherein the final invoice relates to the completion of the transmission of the item of digital data.

19. The method as claimed in claim 13, wherein the final invoice relates to the transmission of portions of the item of digital data from the logged data sources.

20. The method as claimed in claim 13, wherein the final invoice relates to the receipt of portions of the item of digital data by the end user.

* * * * *